US008285233B2

(12) United States Patent
Jothy

(10) Patent No.: US 8,285,233 B2
(45) Date of Patent: Oct. 9, 2012

(54) METHOD FOR DISPLAYING OTHER STATIONS NOW PLAYING LIST

(75) Inventor: Sivanand Jothy, Karnataka (IN)

(73) Assignee: Nokia Corporation, Espoo (FI)

( * ) Notice: Subject to any disclaimer, the term of this patent is extended or adjusted under 35 U.S.C. 154(b) by 325 days.

(21) Appl. No.: 12/641,998

(22) Filed: Dec. 18, 2009

(65) Prior Publication Data

US 2010/0159860 A1 Jun. 24, 2010

(30) Foreign Application Priority Data

Dec. 18, 2008 (IN) .......................... 2869/DEL/2008

(51) Int. Cl.
*H04B 1/04* (2006.01)

(52) U.S. Cl. ..... 455/130; 455/3.01; 455/3.02; 455/3.05; 455/566

(58) Field of Classification Search ................. 455/3.01, 455/3.02, 3.05, 3.06, 41.1, 41.2, 566, 130, 455/145, 154.1, 154.2
See application file for complete search history.

(56) References Cited

U.S. PATENT DOCUMENTS

| | | | | |
|---|---|---|---|---|
| 6,865,600 | B1 * | 3/2005 | Brydon et al. | 709/219 |
| 2006/0288393 | A1 * | 12/2006 | Park | 725/100 |
| 2008/0233954 | A1 * | 9/2008 | Ibrahim et al. | 455/434 |

* cited by examiner

*Primary Examiner* — Tuan Pham
(74) *Attorney, Agent, or Firm* — Banner & Witcoff Ltd.

(57) ABSTRACT

In accordance with example embodiments of the present invention, a method and a corresponding apparatus are described comprising receiving, at a radio receiver, a broadcast program. At another radio receiver, supplementary data related to at least one other broadcast program is received, and at least a part of the received supplementary data is displayed. The radio receiver is switched to a broadcast program corresponding to a selected item of the displayed supplementary data.

17 Claims, 6 Drawing Sheets

METHOD FOR DISPLAYING OTHER STATIONS NOW PLAYING LIST

CROSS REFERENCE TO RELATED APPLICATION

The present application claims priority to India Patent Application No. 2869/DEL/2008 filed Dec. 18, 2008, the contents of which are incorporated by reference herein.

TECHNICAL FIELD

The present application relates generally to the reception of radio broadcasts.

BACKGROUND

Broadcast reception has been popular for a long time, both for audio programs and television (TV) programs. A broadcast receiver may receive one or more broadcast programs from several broadcast stations. However, a user may not always be aware of the broadcast stations that can be received. Especially when travelling, reception conditions may change frequently, and it may not be visible to a user which broadcast stations provide a sufficient signal quality to be received. Thus, it may not be visible which broadcast program or broadcast programs may be available.

In order to provide information about broadcast stations in reach, a broadcast receiver may scan a broadcast transmission band for other radio broadcasts. Further, a radio broadcast may supply supplementary data which describes aspects of the broadcast transmission. Such supplementary data may for example comprise information related to the broadcast station, such as the broadcast station name. Supplementary data may further comprise information related to the transmitted broadcast program or programs.

Radio broadcasts may comprise analogue and digital broadcasts. For example, radio broadcasts may comprise analogue audio transmission, such as frequency modulation (FM) transmission, or digital audio broadcasts, for example digital audio broadcasts according to the Digital Audio Broadcast (DAB) standard, the DAB+ standard, the Digital Multimedia Broadcast (DMB) standard, and/or the like. Further, broadcasts may comprise audio and/or video data, for example broadcasts according to the Digital Video Broadcast (DVB) standard, the Multimedia Broadcast Multicast Service (MBMS) standard, the MediaFLO™ standard, and/or the like. Digital video broadcasts may for example comprise supplementary data in form of an electronic service guide (ESG) or in a file transmission.

In a frequency modulation (FM) radio transmission, supplementary data may be transmitted according to the Radio Data System (RDS) or Radio Broadcast Data System (RBDS) protocol. The supplementary data may for example be related to technical aspects of the network. The supplementary data may also be related to the content of the radio transmission. For example, the Radio Text Plus (RT+) extensions to Radio Text (RT) or enhanced Radio Text (eRT) describe information related to the content, for example a media title, such as a title of a piece of music, the title of a program, or the name of a performing artist or composer.

SUMMARY

Various aspects of examples of the invention are set out in the claims.

According to a first aspect of the present invention, a method is disclosed comprising receiving at a radio receiver a broadcast program, receiving, at another radio receiver, supplementary data related to at least one other broadcast program, displaying at least a part of the received supplementary data, and switching the radio receiver to a broadcast program corresponding to a selected item of the displayed supplementary data.

According to a second aspect of the present invention, an apparatus is disclosed comprising a radio receiver configured to receive a broadcast program, another radio receiver configured to receive supplementary data related to at least one other broadcast program, a display configured to display at least a part of the received supplementary data, and a processor configured to control the broadcast receiver to switch to a broadcast program corresponding to a selected item of the displayed supplementary data.

According to a third aspect of the present invention, a computer program, a computer program product and a computer readable medium are disclosed comprising code for receiving at a radio receiver a broadcast program, code for receiving at another radio receiver supplementary data related to at least one other broadcast program, code for displaying at least a part of the received supplementary data, and code for switching the radio receiver to a broadcast program corresponding to a selected item of the displayed supplementary data, when the computer program is run on a processor.

According to a fourth aspect of the present invention, an apparatus is described comprising a means for receiving a broadcast program, a means for receiving supplementary data related to at least one other broadcast program, a means for displaying at least a part of the received supplementary data, a means for controlling the means for receiving a broadcast program to switch to a broadcast program corresponding to a selected item of the displayed supplementary data.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are best understood by referring to FIGS. 1 through 9 of the drawings.

Figure 1A:
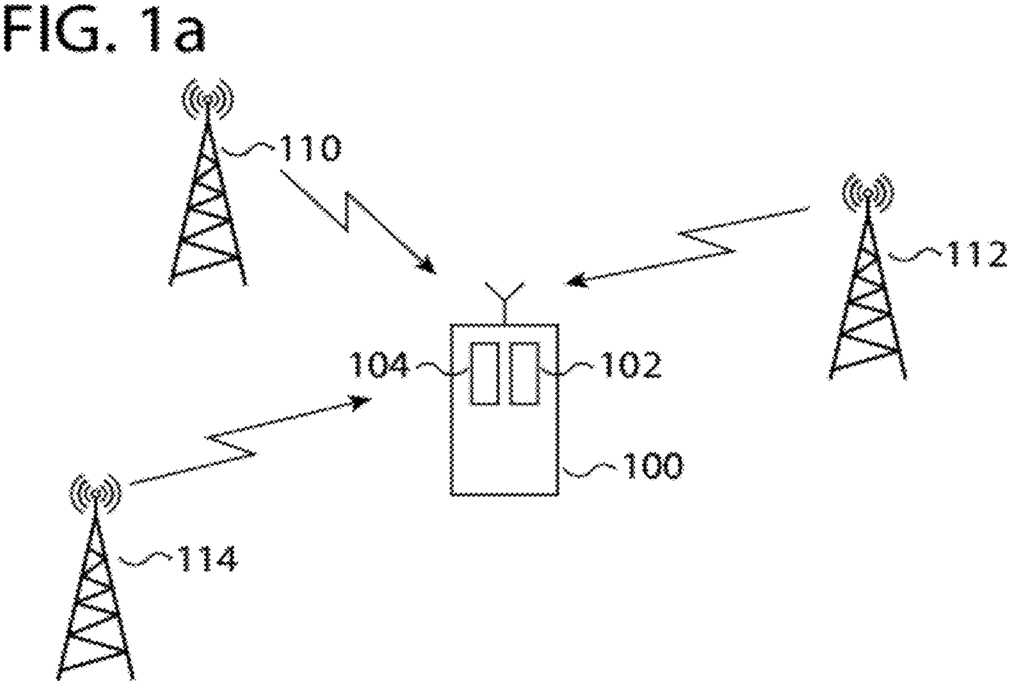
FIG. 1*a* shows a diagram of a system comprising an apparatus according to an example embodiment of the invention.

FIG. 1*a* shows a diagram of a system comprising an apparatus 100 according to an example embodiment of the invention. Apparatus 100 comprises a radio receiver 102, for example a broadcast receiver, receiving a broadcast program from broadcast station 110. The broadcast receiver 102 of apparatus 100 may also be capable of receiving broadcast programs from broadcast stations 112 and 114. Apparatus 100 may comprise another receiver 104 to receive supplementary data comprising supplementary information related to at least one other broadcast program, for example a broadcast program transmitted from broadcast station 112 or from broadcast station 114. The other receiver 104 may comprise a broadcast receiver which may scan a frequency band to find a transmission or transmissions from other broadcast stations such as broadcast stations 112 and 114. If the other broadcast receiver detects a broadcast signal it may start to receive supplementary data, for example if the signal strength of the broadcast signal is sufficiently high to allow receiving and decoding supplementary data.

Figure 1B:
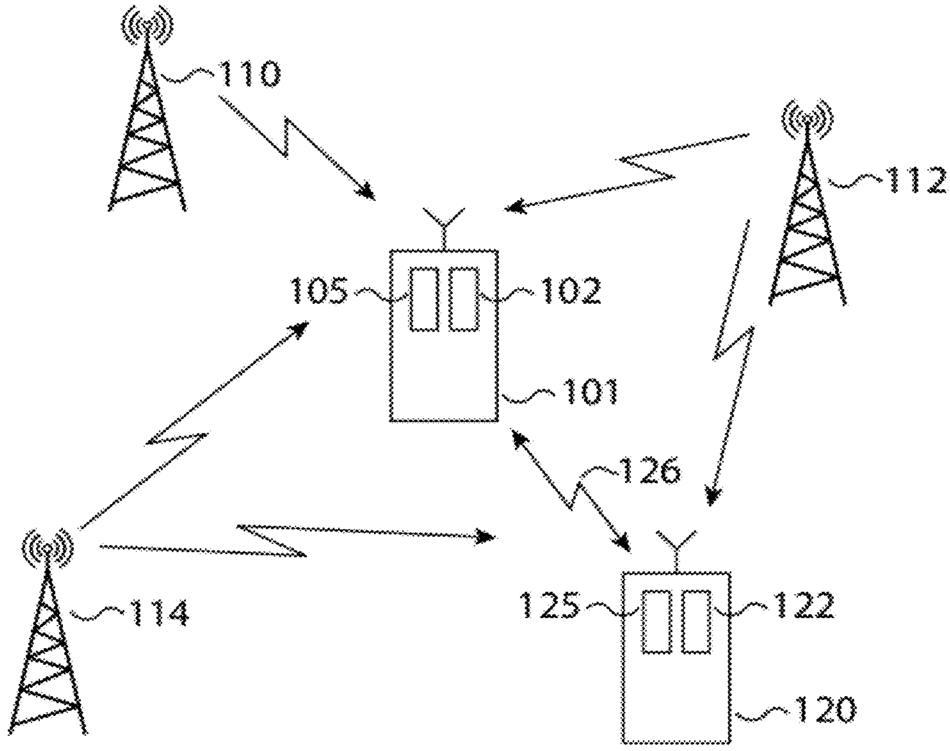
FIG. 1*b* shows a diagram of a system comprising an apparatus according to an example embodiment of the invention using a short range radio connection.

FIG. 1*b* shows a diagram of a system comprising an apparatus according to an example embodiment of the invention using a short range radio connection. Apparatus 101 comprises a radio receiver 102, for example a broadcast receiver, receiving a broadcast program from broadcast station 110. The broadcast receiver 102 of apparatus 100 may also be capable of receiving broadcast programs from broadcast stations 112 and 114. Apparatus 100 may comprise another receiver 105 to receive supplementary data comprising supplementary information related to at least one other broadcast program on a short range radio transmission 126. The other receiver 105 may comprise a short range radio receiver, for example a Bluetooth™ receiver, that receives supplementary data related to at least one other broadcast program from short range radio transceiver 125 of another apparatus 120 by short range radio transmission 126. The other apparatus 120 may itself receive supplementary data related to other broadcasts with radio receiver 122 from a broadcast station, for example from broadcast station 112 or broadcast station 114.

In an example embodiment, apparatus 100, 101 of FIGS. 1*a* and 1*b* may be stationary or mobile. Apparatus 100, 101 may also be built into a vehicle, for example a car or a truck. Apparatus 100, 101 may also be a mobile phone.

In an example embodiment, the broadcast stations 110, 112 and 114 may be FM radio stations, the radio receiver 102 and the other radio receiver 104 may be FM radio receivers. The transmitted FM radio signal may comprise supplementary data as RDS or RBDS data. The other broadcast receiver of apparatus 100, 101 may scan for a broadcast station carrying a descriptor of a certain program type code (PTY) of a transmitted program, for example "News" or "Pop music". When a broadcast transmission with a preferred program type has been found, reception by the FM radio receiver may be switched to the broadcast station transmitting the preferred program type. A user confirmation may be required before the switch.

Figure 2:
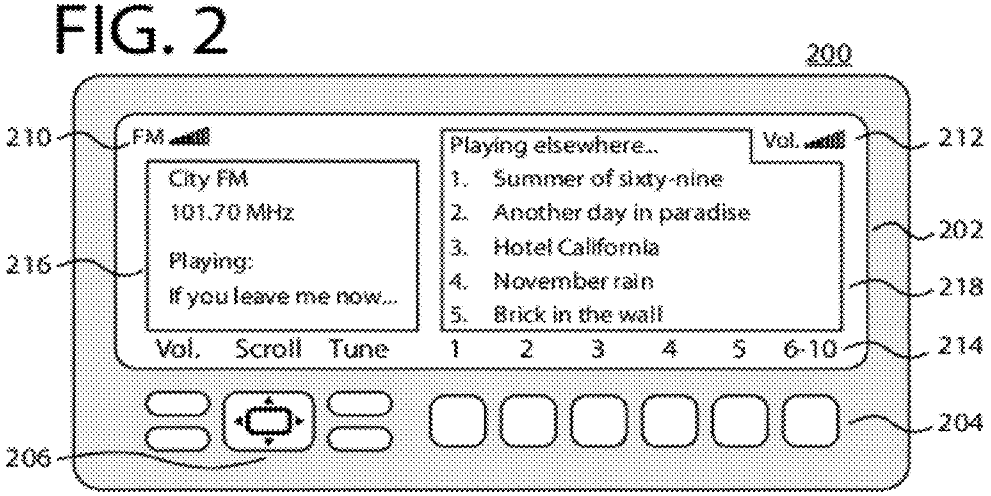
FIG. 2 illustrates an apparatus showing an information display according to an example embodiment of the invention.

FIG. 2 illustrates an apparatus 200 showing an information display according to an example embodiment of the invention. Apparatus 200 may be used as apparatus 100, 101 in the system of FIGS. 1*a* and 1*b*, comprising a radio receiver 102 and another radio receiver 104, 105. Apparatus 200 may comprise a radio receiver configured to receive FM broadcast signals. Display 202 of apparatus 200 may be divided in several areas. In the illustrated example, an area 210 in the top left corner shows an indication of a received signal strength of a received FM radio signal. Area 212 in the top right corner may show a volume level. Labels 214 shows one or more functions of one or more soft keys 204 next to the display 202.

The radio receiver of apparatus 200 may receive an FM radio broadcast. For example, the radio receiver is tuned to 101.70 MHz, receiving a broadcast station "City FM", playing a song with a title "If you leave me now . . . ", as shown in area 216 of display 202. Information on the broadcast station name and a media title, for example a program name or the played song title, may be received on an RDS or an RBDS subcarrier of the tuned FM radio broadcast. The supplementary data of the station name and the media title may be received by the radio receiver or by the other radio receiver.

In the illustrated example, the other radio receiver may scan the FM radio band for one or more other FM radio broadcasts. When the other radio receiver detects a signal with a sufficient signal strength in order to receive and decode RDS/RBDS supplementary data, the other radio receiver receives and decodes the supplementary data. At least a part of the supplementary data may be stored in a memory of apparatus 200 as a list entry. The supplementary data may be stored along with an indication of the received FM radio frequency. For example, apparatus 200 may store the media title along with a frequency of the broadcast transmission from the broadcast station. In an example embodiment, apparatus 200 also stores the name of an artist and the name of the FM radio station. While other radio stations with other radio broadcasts are found during the scanning process, list entries may be added. Further, list entries may be updated with supplementary data, for example if a list entry for a broadcasting station already exists and new supplementary data is received during the scanning process. List entries may be updated when the new supplementary data differs from the stored supplementary data, for example when a media title changes because one program has ended and another program has started.

In an example embodiment, information on the media title, for example the title of a program or the title of a piece of music, is received as data from radio text (RT) or radio text plus (RT+). RT and RT+ define supplementary data for the RDS/RBDS standards. The title of an item, for example a track title of an album, may be coded as ITEM.TITLE according to an RT+ definition. The title of a program may be coded as PROGRAMME.NOW according to an RT+ definition. The name of an artist may be coded as ITEM.ARTIST according to an RT+ definition. RT+ definitions are described in "Annex P, Coding of Radio Text Plus information (RT+)", release 08 2008, of the RDS TS standard, published by the RDS Forum and available for example on www.rds.org.uk. The RDS standard (IEC 62106:1999) and annex P are incorporated by reference.

Apparatus 200 may display at least some parts of the received information in an area 218 of display 202. In an example embodiment, received information is shown as a list entry "1. Summer of sixty-nine". Further list entries of supplementary data, that may be received during a scanning process, may also be shown in area 218 of display 202, for example as entry "2. Another day in paradise" and so on.

In the illustrated example, labels 214 show numbers "1" to "5" and "6-10", indicating the functions of the soft keys 204 next to the display 202. An entry, for example a list entry, in area 218 may be selected by pressing a corresponding soft key. For example, list entry 4 may be selected by pressing a soft key labeled "4". There may be the same number of soft keys as list entries displayed in area 218. Then, the labels 214 may correspond directly to the displayed list entries. There may be more soft keys than list entries. Then, a part of the labels 214 may correspond to list entries shown in area 218. Soft keys that are not assigned to displayed list entries may be assigned to list entries adjacent to the first and/or the last shown list entry. For example, the rightmost of the soft keys 204 is labeled "6-10". Pressing this soft key may result in list entries 6 to 10 to be shown in area 218, thus replacing list entries 1 to 5. Soft keys that are not assigned to displayed list entries may also be assigned to other functions of apparatus 200.

In an example embodiment, list entries corresponding to programs that are received by the other radio receiver are shown unfiltered in area 218. In a further embodiment, list entries are filtered. For example, list entries are filtered by a genre. A genre of a station may be decoded from the PTY field of the RDS information, for example "Pop Music" or "News". A genre may further be decoded from the RT+ definition ITEM.GENRE. The list entries may be filtered by the same genre as the genre of the program that is received by the radio receiver, shown in area 216. For example, if a station, for example the station "City FM" which is received at 101.70 MHz, indicates the genre as "Pop Music", then list entries of stations also indicating "Pop Music" as genre, either by the PTY field or by the ITEM.GENRE field, are shown.

In a further example embodiment, list entries are filtered by a user preference. For example, a user preference indicates the genre as "News" and "Information". Then list entries may be shown of stations also indicating "News" or "Information" as genre, independent of the genre of the program that is received by the radio receiver.

In an example embodiment, list entries for stations shown in area 218 are sorted. For example, list entries may be sorted by genre, showing first the entries of the same genre as the program that is received by the radio receiver. In a further example, list entries may be sorted by genre, showing first the entries in accordance with a user preference. For example, a user preference may define the order of genres as "News" first, "Information" second, "Pop Music" third, and then other genres. Thus, area 218 will first show list entries of stations indicating as genre "News", then list entries of stations indicating as genre "Information", next list entries of stations indicating as genre "Pop Music". List entries of stations indicating another genre may be shown at the bottom end of area 218 or may not be shown at all.

Area 218 may not show all list entries. In an example embodiment, the first 5 entries are shown. Other entries may be shown by scrolling through the list, for example by pressing the soft key labeled "6-10", by pressing the up and down keys of multi-controller 206, or by any other scrolling method.

Figure 3:
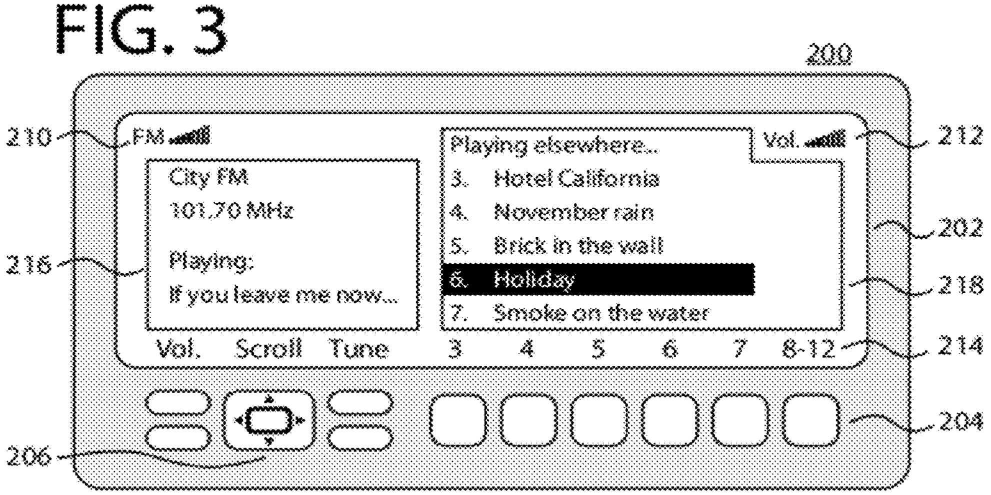
FIG. 3 illustrates an apparatus showing an information display according to an example embodiment of the invention with a highlighted list entry.

FIG. 3 illustrates the apparatus 200 showing an information display according to an example embodiment of the invention with a highlighted list entry. Further, a list of entries 3 through 7 is shown after scrolling through the list, for example with the up and down keys of multi-controller 206. For example, pressing the down key of multi-controller 206 once, may show list entries 2 to 6 in area 218, pressing the down key of multi-controller 206 a second time will show list entries 3 to 7 in area 218 as shown in FIG. 3. The functions of soft keys 204 displayed with labels 214 may be altered accordingly. For example, labels "1" to "5" and "6-10" may change to labels "3" to "7" and "8-12", when list entries 3 to 7 are shown in area 218.

In an example embodiment, a selected list entry in area 218 may be highlighted, for example by using bold letters, or by using a different color for the text of the list entry, or by using a different color for the highlighted text and a contrasting background box. The different color may be an inverse color in order to improve contrast. In an example embodiment, pressing the down key of multi-controller 206 repeatedly will highlight successive list entries. In the example embodiment of FIG. 3, the $6^{th}$ list entry is highlighted by an inverse color on a contrasting background box, for example white text on a black box in contrast to non-highlighted black text on a white background for other list entries. A highlighted list entry may be selected by pressing the center key of multi-controller 206.

In an example embodiment, additional information is shown in area 218. The additional information may comprise supplementary data, for example the name of an artist, the name of the FM radio station. Additional information may comprise information derived from supplementary data, as described in the following paragraph.

In an example embodiment, supplementary data comprises information about the play time of a media, for example a program or a song. For example, supplementary data may comprise a start and an end time of a media. In a further example, it may comprise a total time of a media and an indication of an already elapsed time from a media. In a further example, it may comprise an indication of a remaining play time for a media. Additional information, such as remaining play time for a media, may thus be derived directly from the supplementary data. In an example embodiment, a remaining play time may be calculated from the supplementary data as ("total time"–"elapsed time"). In another example embodiment, a remaining play time may be calculated from the supplementary data and a current time as ("end time"–"current time"). As supplementary data is received for each list entry in intervals, the remaining play time may be updated according to a resolution of the displayed time indication. For example, if the resolution of the displayed time indication is seconds, then the remaining play time may be counted down every second until the supplementary data corresponding to the list entry is received again.

Figure 4:
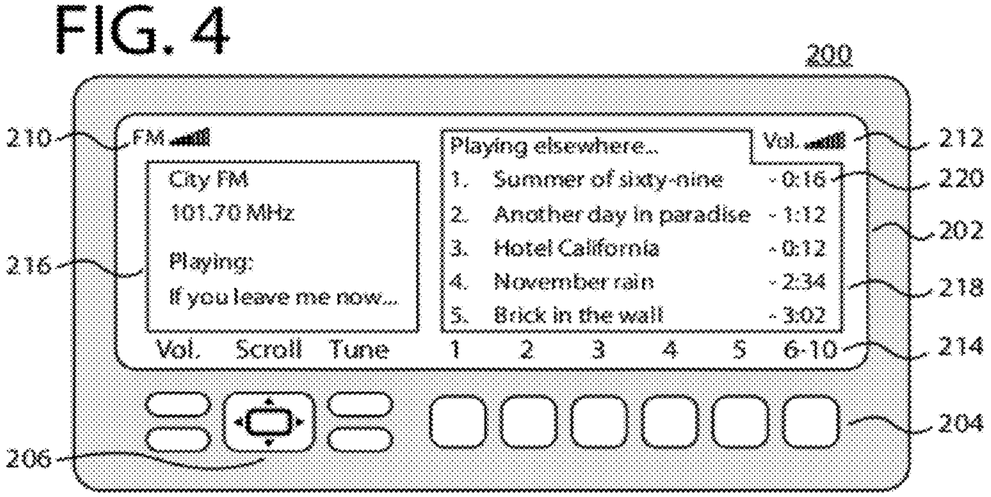
FIG. 4 illustrates an apparatus showing an information display according to an example embodiment of the invention further displaying a remaining play time.

FIG. 4 illustrates an apparatus 200 showing an information display according to an example embodiment of the invention showing a remaining play time 220 for one or more list entries in area 218. In an example embodiment, a remaining play time for the list entry is indicated by a negative value. For example, the remaining play time of the song title of the list entry "1. Summer of sixty-nine" may be 16 seconds, which is indicated by "–0:16". The remaining play time of the song title of the list entry "2. Another day in paradise" may be 1 minute and 12 seconds, which is indicated by "–1:12". In an example embodiment, the remaining play time may be shown using a graphic representation. For example, the remaining play time may be represented as a bar, wherein the remaining play time corresponds to the length of the bar.

Figure 5:
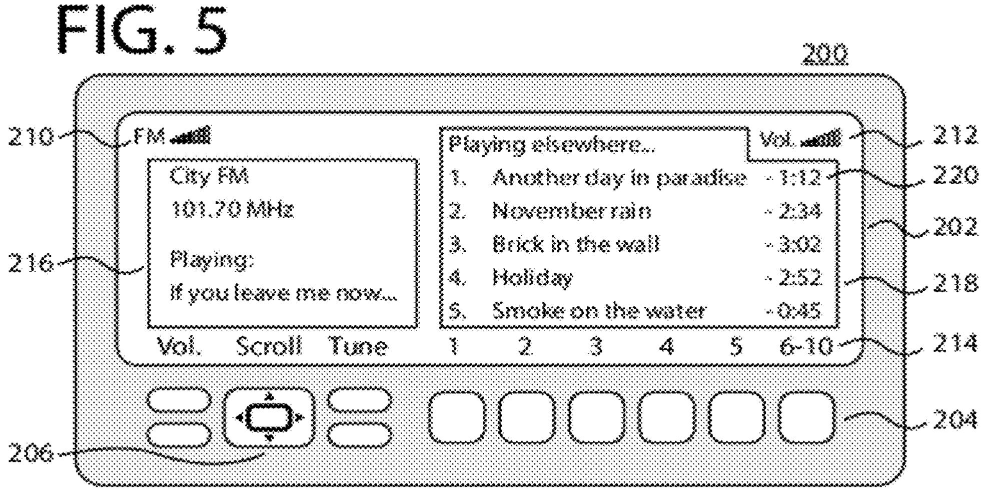
FIG. 5 illustrates an apparatus showing an information display according to an example embodiment of the invention with list entries filtered by a remaining play time.

FIG. 5 illustrates an apparatus showing an information display 200 according to an example embodiment of the invention filtered by a remaining play time. In the example embodiment of FIG. 5, list entries with a remaining play time 220 larger than a threshold value are displayed. For example, only list entries with a remaining play time of more than 30 seconds are shown. Thus, list entries 1 and 3 from FIG. 4 are not shown in FIG. 5, as they have remaining play times of 16 seconds and 12 seconds, respectively. As these list entries are deleted from the list shown in area 218, other list entries may take their place.

In an example embodiment, list entries are shown in area 218 in a sorted manner. For example, list entries may be sorted by a remaining play time. List entries with the longest remaining play time may be shown first in the list. The list may be continuously updated, as list entries are removed from the list, when the remaining play time is zero or below a threshold. The list may also be updated, as new list entries are added to the list, for example when new supplementary data is received.

The threshold value may be stored in a memory of apparatus 200. The threshold value may be user defined and may be stored as a user preference. In an example embodiment, the threshold value may be entered by a user on keys 204 of apparatus 200. The threshold value may thus take any value provided by the user. For example, the threshold value may be 5 seconds. In another example, the threshold value may be 12 minutes.

In an example embodiment, at least one title of a media, for example a title of a program or of a piece of music, is stored as a user preference or as part of a list of user preferences based on an input on a user interface. For example, a user may input the title of a piece of music "Hotel California". The title may be stored as a user preference in a memory of the apparatus.

Figure 6:
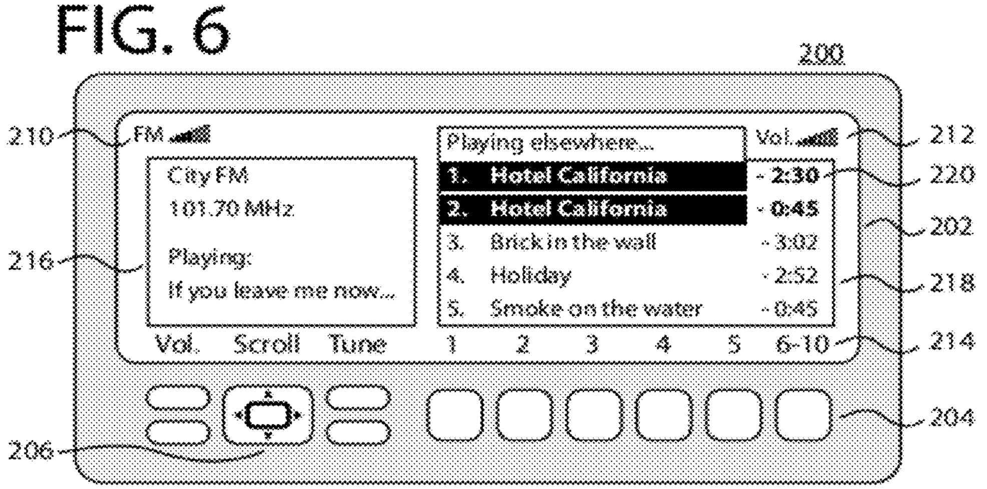
FIG. 6 illustrates an apparatus showing an information display according to an example embodiment of the invention with list entries filtered by a user preference.

FIG. 6 illustrates an apparatus showing an information display 200 according to an example embodiment of the invention with list entries filtered by a user preference. In an example embodiment, list entries shown in area 218 of display 202 are filtered by a user preference. For example, area 218 may show matching titles. For example, a first broadcast station may currently play "Hotel California" with a remaining play time of 45 seconds, and a second broadcast station may currently play "Hotel California" with a remaining play time of 2 minutes 30 seconds. Area 218 of display 202 may show two matching list entries with title "Hotel California", for example sorted by a remaining play time 220. Based on a user selection entered on the user interface of the apparatus, one of the two list entries is selected. In response to the user selection, the radio receiver may switch to the broadcast station corresponding to the selected item of the list.

In the example embodiment of FIG. 6, list entries shown in area 218 of display 202 are filtered by a user preference, and matching list entries are highlighted in accordance with the result of the filtering process. Area 218 of display 202 may show the two list entries matching the title "Hotel California" in a highlighted manner, for example by using bold letters, or by using a different color for the text of the list entry or list entries, or by using an inverse color for the highlighted text and a contrasting background. Matching titles may be grouped together, so that they are shown as successive list entries in area 218, for example as top entries of the list shown in area 218.

In another example embodiment, list entries shown in area 218 of display 202 are filtered by a user preference, and a matching title may be selected automatically in accordance with the result of the filtering process. For example, if no title of the list entries matches the user preference, then the apparatus may work as before. If one title of the list entries matches the user preference, the apparatus may switch the radio receiver automatically to the broadcast station corresponding to the matching item. If more than one title of the list entries matches the user preference, the apparatus may switch the radio receiver automatically to the broadcast station corresponding to the matching item with the longest remaining play time. However, the apparatus may not switch to a radio station if the remaining play time of the corresponding list entry is below a threshold value, for example a threshold value of 20 seconds. In a further example embodiment, if more than one title of the list entries matches the user preference, or if more than one user preference for a title is matched, the apparatus may randomly select one of the titles and switch the radio receiver automatically to the broadcast station corresponding to the selected item.

A user preference may also be entered and stored describing whether the filtering process comprises only exact matches or also close matches. For example, a user preference may be entered as "California". Then all titles of pieces of music containing the word "California" will be included in the selection, for example "Hotel California", "California dreaming" and so on. A close match may also be achieved if the user misspelled the media title, for example if the user erroneously entered "Hotell California" instead of "Hotel California".

In an example embodiment, one or more names of an artist may be entered as a user preference or as a list of user preferences. When supplementary data related to other broadcast programs or broadcast stations is received by the other radio receiver, the field ITEM.ARTIST of the RT+ definitions may be filtered by the user preference or by one or more items of the list of user preferences.

If the artist name of more than one song titles matches the filter criterion, matching items may be presented in area 218 of the display 202 for a user selection. Matching items may be sorted and/or grouped by artist, by a remaining play time, for example by a decreasing remaining play time, and/or the like. If desired, matching items may not be presented if the remaining play time of the corresponding list entry is below a threshold value, for example a threshold value of 20 seconds.

In an example embodiment, one or more titles and one or more names of an artist may be entered as a user preference or as a list of user preferences. For example, the title "Perfect day", the artist name "Chris de Burgh" and the artist name "Roxette" may be entered in a list of user preferences. The filtering process may comprise finding a matching song title and a matching artist. For example, the filtering process may find the song title "Perfect day" by Chris de Burgh (matching song title and name of artist) and the song title "Perfect day" by Roxette (matching song title and name of artist). In another example, the filtering process comprises finding at least one member of the list of user preferences, for example one of a matching song title or a matching artist. In the example, the filtering process may find the song title "Don't pay the ferryman" by Chris de Burgh (matching name of the artist) and the song title "Perfect day" by John Farnham (matching song title).

Also other criteria for filtering the supplementary data may be used. For example, ITEM.ALBUM, ITEM.COMPOSER, or INFO.TRAFFIC from the RT+ definitions may be used or any other criteria corresponding to received supplementary data.

Embodiments of the invention have been described in relation to FM radio. Further embodiments may relate to other analog or digital radio broadcasts, for example digital audio broadcasts according to the Digital Audio Broadcast (DAB) standard, the DAB+ standard, the Digital Multimedia Broadcast (DMB) standard, and/or the like. Then apparatus 100, 101, 200 may comprise a digital radio receiver and another digital radio receiver. Further, broadcasts may comprise audio and/or video data, for example broadcasts according to the Digital Video Broadcast (DVB) standard, the Multimedia Broadcast Multicast Service (MBMS) standard, according to the MediaFLO™ standard, and/or the like. Then, apparatus 100, 101, 200 may comprise a digital TV receiver and another digital TV receiver for receiving supplementary data. Apparatus 100, 200 may have more than one display, for example one display for showing a received video stream, and at least one other display for presenting supplementary data in a way as described in relation to FIGS. 2 to 6.

In an example embodiment, supplementary data may be received from another apparatus having a broadcast receiver, for example apparatus 120 of FIG. 1*b*. The supplementary data may be received from the other apparatus with a cellular radio receiver, for example with a Global System for Mobile communications (GSM) radio receiver, a Universal Mobile Telecommunications System (UMTS) radio receiver, a wide-band code division multiple access (W-CDMA) radio receiver, or the like. The supplementary data may further be received from the other apparatus with a short range radio receiver, for example a wireless local area network (W-LAN) radio receiver, a Bluetooth™ radio receiver, or the like.

Referring to FIG. 1*b* again, in an example scenario, a user of an apparatus 101 listens to a broadcast program received by an FM radio receiver 102. At the same time, another user of another apparatus 120 comprising an FM radio receiver 122 listens to another FM radio station playing a favorite broadcast program, for example a piece of music. The other apparatus 120 receives supplementary information on broadcast program, for example a title of the piece of music. In order to share the favorite broadcast program with the user of the apparatus, a short range radio connection, for example a Bluetooth™ connection, is set up between a short range radio receiver 105 of apparatus 101 and short range radio transceiver 125 of the other apparatus 120. Supplementary data relating to the favorite broadcast program is transmitted on the Bluetooth™ connection 126 to apparatus 101 from the other apparatus 120. For example, the title of the piece of music is transmitted on the Bluetooth™ connection 126 along with an indication of the FM radio station, for example the station name and/or the frequency of the transmission. At the apparatus 101, it may be checked whether a station with the station name can be received, or whether a transmission with the title of the piece of music may be received at the indicated frequency. The title of the piece of music may be indicated on a display of the apparatus for a selection by a user, for example on display 202 of an apparatus 101/200 of FIG. 2. The user of the apparatus may select the favorite broadcast program of the other user, or the user may continue listening to the broadcast program that is already playing on the apparatus. In an example embodiment, the favorite program of the other user is automatically selected, for example when a list of user preferences at the apparatus comprises the favorite broadcast program. Thus, users may share a favorite program that is transmitted on a broadcast transmission.

Figure 7:
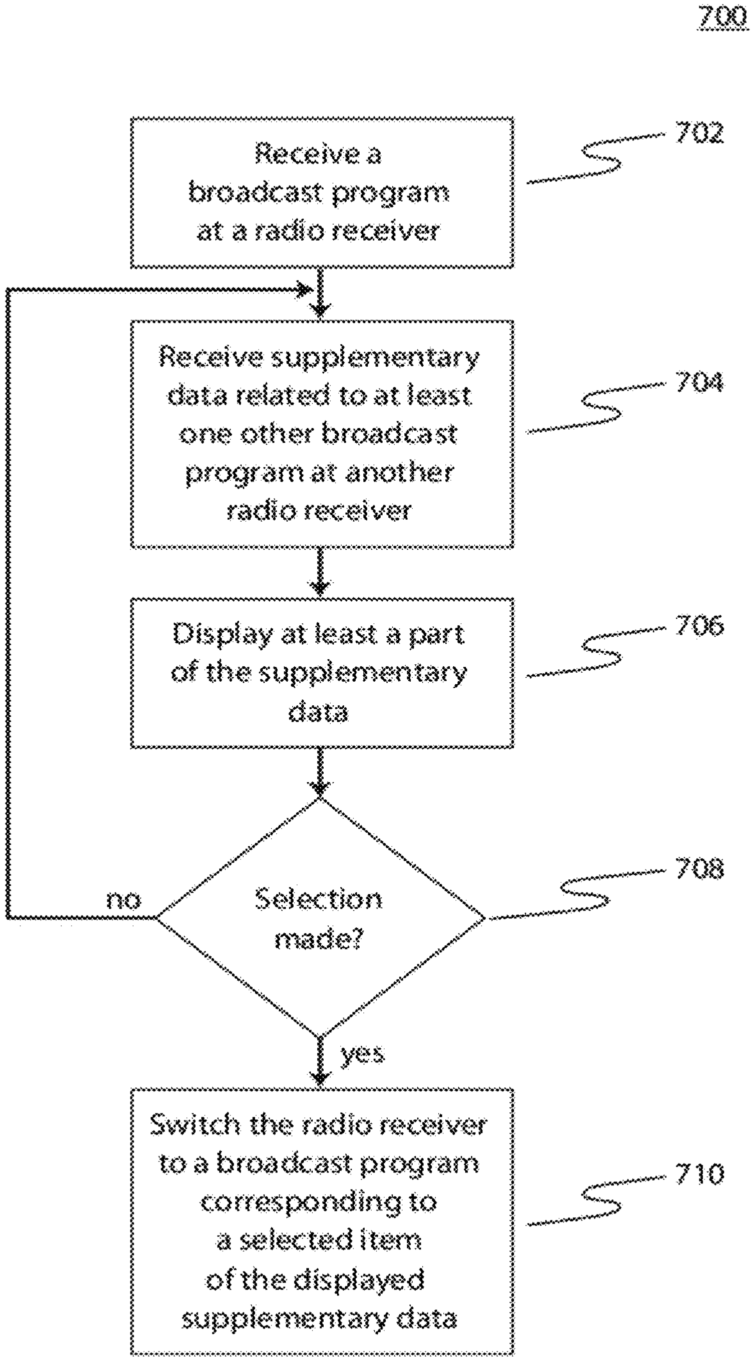
FIG. 7 is a flowchart illustrating a method for selecting a radio broadcast according to an example embodiment of the invention.

FIG. 7 is a flowchart illustrating a method 700 according to an example embodiment of the invention. The method 700 may be executed by apparatus 100, 101, 200.

At block 702, a broadcast program is received at a radio receiver, for example a music program is received from a broadcast station. At block 704, supplementary data related to at least one other broadcast program is received at another radio receiver. For example, the other radio receiver may scan for transmissions from other broadcast stations. The other radio receiver may receive and decode supplementary data. The other radio receiver may find information related to one or more transmitted broadcast programs in the supplementary data.

At block 706, at least a part of the supplementary data is displayed, for example on a display 202 of apparatus 200. The displayed supplementary data may be the information related to the one or more transmitted broadcast programs, for example a media title, such as a name of a program or a piece of music. Displayed supplementary data may be filtered, for example based on a user preference or on a list of user preferences. The list of user preferences may comprise a media title, an artist name, an album name, and/or the like. Filtered supplementary data may be displayed in a highlighted manner.

At block 708 it is checked whether a selection is made. An item from the displayed supplementary data may be selected by user input from a keypad, for example from soft keys 204. An item may also be selected automatically, when the item matches at least one member of a list of user preferences. If no selection is made at block 708, method 700 may return to block 704, continue receiving supplementary data and update the display accordingly at block 706. If a selection is made at block 708, method 700 continues to block 710. At block 710, the radio receiver is switched to a broadcast program corresponding to a selected item of the displayed supplementary data. For example, the receiver is tuned to a station with a broadcast program that plays a selected song title. A user may thus select a favorite media title easily.

Figure 8:
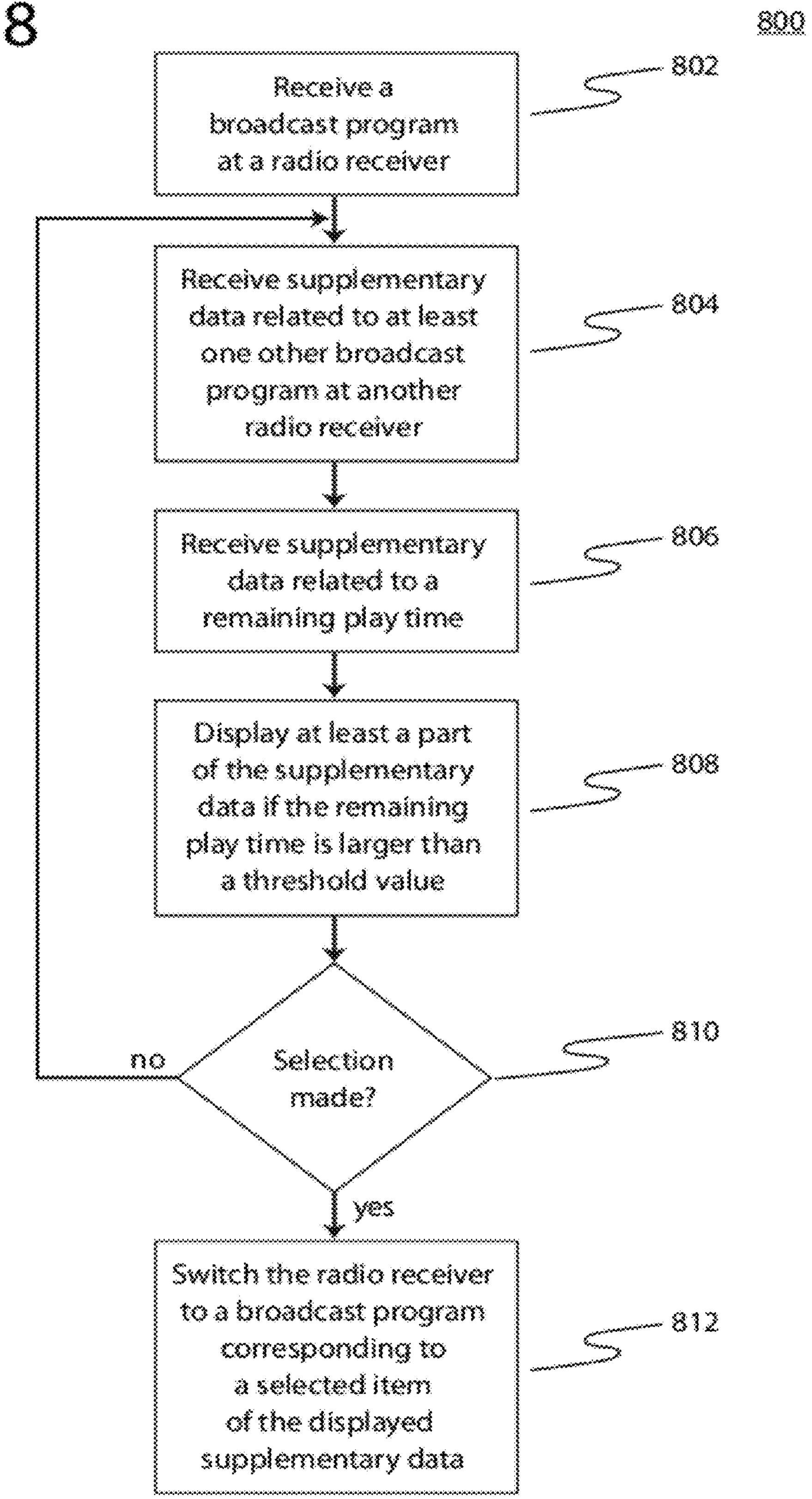
FIG. 8 is a flowchart illustrating a method for selecting a radio broadcast according to an example embodiment of the invention comprising filtering by a remaining play time.

FIG. 8 is a flowchart illustrating a method 800 according to an example embodiment of the invention comprising filtering by a remaining play time. The method 800 may be executed by apparatus 100, 101, 200.

At block 802, a broadcast program is received at a radio receiver, for example a music program is received from a broadcast station. At block 804, supplementary data related to at least one other broadcast program is received at another radio receiver. For example, the other radio receiver may scan for transmissions from other broadcast stations. The other radio receiver may receive and decode supplementary data. The other radio receiver may find information related to one or more transmitted broadcast programs in the supplementary data. At block 806, supplementary data related to a remaining play time is received. For example, for each media title, data corresponding to a remaining play time of the media title may be received. In an example embodiment, the supplementary data is received from a broadcast station. In another example embodiment, the supplementary data is received from a short range radio transceiver.

At block 808, at least a part of the supplementary data is displayed, for example on a display 202 of apparatus 200. The displayed supplementary data may comprise the information related to the remaining play time of one or more media titles. The remaining play time may be updated regularly, for example every second or every minute. In an example embodiment, the supplementary data is only shown on the display, if the remaining play time is longer than a threshold value, for example 20 seconds or 5 minutes. The threshold value may be stored as a user defined preference.

In addition to the filtering of supplementary data with a minimum remaining play time, the displayed supplementary data may further be filtered, for example based on a user preference or on a list of user preferences as described in relation to the method of FIG. 7.

At block 810 it is checked whether a selection is made. An item from the displayed supplementary data may be selected by user input from a keypad, for example from soft keys 204. An item may also be selected automatically, when the item matches at least one member of a list of user preferences. If no selection is made at block 810, method 800 may return to block 804, continue receiving supplementary data and update the display accordingly at block 808. If supplementary data related to a remaining play time is received at block 806 for one or more media titles, also the remaining play time may be updated for the one or more media titles. If a selection is made at block 810, method 800 continues to block 812.

At block 812, the radio receiver is switched to a broadcast program corresponding to a selected item of the displayed supplementary data. For example, the receiver is tuned to a station with a broadcast program that plays a selected song title. A user may thus easily select a favorite media title.

Figure 9:
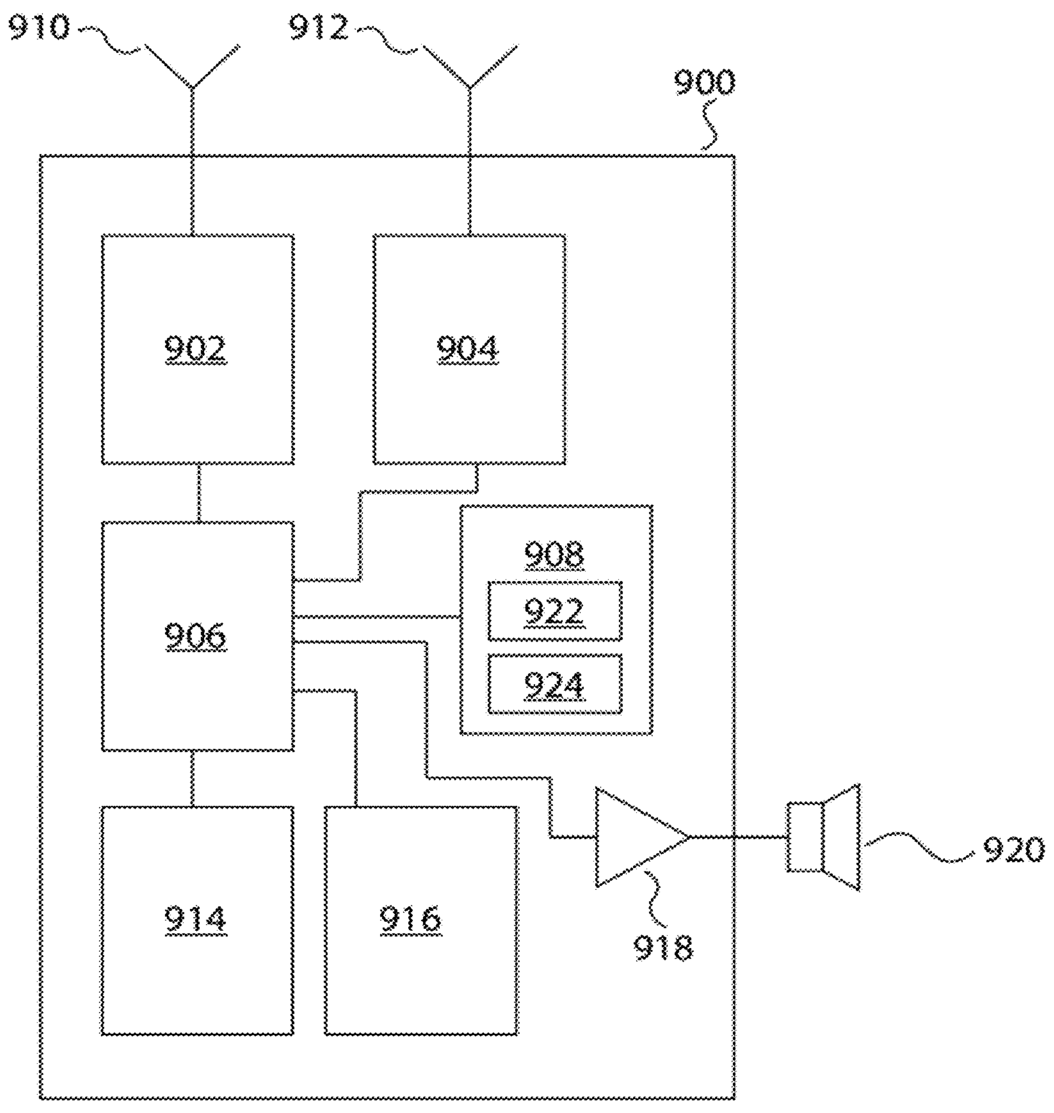
FIG. 9 shows a block diagram of an apparatus according to an example embodiment of the invention.

FIG. 9 shows a block diagram of an apparatus 900 according to an example embodiment of the invention, for example apparatus 100, 101 or 200 as described in relation to FIGS. 1 and 2. Apparatus 900 comprises a broadcast receiver 902 and another broadcast receiver 904 coupled to a controller 906.

The other broadcast receiver 904 may be configured to receive supplementary data. Broadcast receiver 902 may be coupled to an antenna 910, and broadcast receiver 904 may be coupled to an antenna 912. However, in an example embodiment, broadcast receivers 902 and 904 may be coupled to a single antenna. In an example embodiment, apparatus 900 may be a mobile device, for example a mobile phone. A wired headset may be connectable which comprises at least one wire acting as antenna 910/912 when the wired headset is connected. Broadcast receiver 902 may be configured to receive a radio broadcast; broadcast receiver 904 may be configured to receive supplementary data related to at least one other broadcast program. Apparatus 900 further comprises a user interface comprising a keypad 914 to detect a user input and a display 916. Display 916 may be configured to display at least a part of the received supplementary data. Display 916 may comprise a touch screen which may replace at least a part of the user input functionality of the keypad 914. Apparatus 900 may also comprise a microphone for user input and a speech-to-text function. Thus, for example a user preference may be entered as speech. Apparatus 900 may further comprise an amplifier 918. The output of amplifier 918 may be coupled to a loudspeaker 920. Loudspeaker 920 may thus reproduce an audio signal received and decoded from a broadcast program by radio receiver 902. The output of amplifier 918 may also be coupled to a plug in order to provide a connection to a wired headset. Controller 906 may control the broadcast receivers 902 and 904. For example, controller 906 may be configured to control broadcast receiver 902 to switch to a broadcast program corresponding to a selected item of displayed supplementary data. Controller 906 may also be configured to control broadcast receiver 904 to scan for other broadcast programs. Controller 906 may further control an input device, for example keypad 914 and/or a touch screen. Controller 906 may also control display 916 and amplifier 918. Controller 906 may be configured to base a selection of an item of displayed supplementary data on a signal from keypad 914. Controller 906 may be a microprocessor, a digital signal processor or the like. Controller 906 may further receive one or more input signals from keypad 914 corresponding to a user input on the keypad. Apparatus 900 may further comprise a memory 908, for example a Flash memory. Memory 908 may be configured to store a computer program comprising computer program instructions in area 922. The computer program comprises at least instructions to be executed by controller 906 for control of the broadcast receivers 902 and 904 and for display 916. Controller 906 may be configured to store user preferences in area 924 of memory 908. User preferences may be applied in relation to the usage of broadcast receiver 902 and/or 904. Memory 908 may comprise one or more memory modules. For example, the computer program may be stored in an area 922 of a read only memory (ROM), and user preferences may be stored in an area 924 of a Flash memory.

Without in any way limiting the scope, interpretation, or application of the claims appearing below, it is possible that a technical effect of one or more of the example embodiments disclosed herein may be to inform a user about broadcast programs that are played at the same time. Embodiments of the present invention may relate to aiding a user in selecting a preferred radio broadcast by use of supplementary data that is transmitted along with a radio signal. Alternative broadcast programs may be filtered, grouped and sorted by one or more user preferences. Alternative broadcast programs may be shown with a remaining play time that may be continuously updated. Alternative broadcast programs may be filtered by a remaining play time, so that only broadcast programs are presented to the user, which he/she may find worthwhile switching to. Thus, a user selection of an alternative broadcast program may be facilitated. User preferences may be stored in memory. Thus, the presentation of alternative broadcast programs may be customized by a user. Customization may also allow automatic switching to another broadcast program, when this is desired by the user.

Embodiments of the present invention may be implemented in software, hardware, application logic or a combination of software, hardware and application logic. The software, application logic and/or hardware may reside on an integrated circuit or on a receiver module. The integrated circuit or receiver module may comprise analog and digital circuitry. If desired, part of the software, application logic and/or hardware may reside on a receiver module or integrated circuit, part of the software, application logic and/or hardware may reside on a processing module or integrated circuit. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:

receiving, at a first radio receiver, a first program currently being broadcast;

receiving, at a second radio receiver, supplementary data describing content of a second program currently being broadcast;

receiving further supplementary date related to a remaining play time of the second program;

displaying at least a part of the received supplementary data to describe the content of the second program, wherein the supplementary data is only displayed when the remaining play time is larger than a threshold value; and switching the first radio receiver to receive the second program.

2. The method of claim 1, wherein the supplementary data comprises a media title.

3. The method of claim 1, wherein the supplementary data comprises at least one of a name of a program or a piece of music.

4. The method of claim 1, wherein the second radio receiver comprises a short range radio receiver.

5. The method of claim 1, wherein the first radio receiver comprises a first frequency modulation radio receiver, the second radio receiver comprises a second frequency modulation radio receiver, and wherein the supplementary data is received as data of at least one of a radio data system and a radio broadcast data system.

6. The method of claim 5, wherein the second radio receiver scans for other programs currently being broadcast.

7. The method of claim 1, further comprising storing a media title as a user preference based at least in part on an input on a user interface.

8. The method of claim 1, further comprising comparing at least one item of the supplementary data to at least one user preference; and displaying the at least one item of supplementary data in a highlighted manner that matches at least one of the at least one user preference.

9. The method of claim 1, wherein the switching occurs automatically in response to information associated with the second program matching at least one user preference.

10. An apparatus comprising:

a first radio receiver configured to receive a first program currently being broadcast;

a second radio receiver configured to receive supplementary data describing content of a second program currently being broadcast and further supplementary data related to a remaining play time of the second program;

a display configured to display at least a part of the received supplementary data to describe the content of the second program when the remaining play time is longer than a threshold value; and a processor configured to control the first radio receiver to switch to receive the second program.

11. The apparatus of claim 10, further comprising an input device, and wherein the processor is further configured to switch to the second program based on a signal from the input device.

12. The apparatus of claim 10, wherein the supplementary data comprises a media title.

13. The apparatus of claim 10, wherein the second radio receiver comprises a short range radio receiver.

14. The apparatus of claim 10, wherein the first radio receiver comprises a first frequency modulation radio receiver; and wherein the second radio receiver comprises a second frequency modulation radio receiver configured to receive supplementary data as data of at least one of a radio data system and a radio broadcast data system.

15. The apparatus of claim 14, wherein the second radio receiver is configured to scan for other programs currently being broadcast.

16. The apparatus of claim 10, further comprising a user interface; and a memory configured to store a media title as a user preference based at least in part on an input on the user interface.

17. A non-transitory computer readable medium storing instructions that, when executed, cause an apparatus at least to:

receive, at a first radio receiver, a first program currently being broadcast;

receive, at a second radio receiver, supplementary data describing content of a second program currently being broadcast and further supplementary data related to a remaining play time of the second program;

display at least a part of the received supplementary data to describe the content of the second program in response to determining thst the remaining play time is longer than a threshold value; and switch the first radio receiver to receive the second program.

* * * * *

UNITED STATES PATENT AND TRADEMARK OFFICE

CERTIFICATE OF CORRECTION

PATENT NO. : 8,285,233 B2
APPLICATION NO. : 12/641998
DATED : October 9, 2012
INVENTOR(S) : Sivanand Jothy It is certified that error appears in the above-identified patent and that said Letters Patent is hereby corrected as shown below:

In Column 14, Claim 17, Line 35:
Please delete "thst" and insert --that--

Signed and Sealed this
Second Day of April, 2013

Teresa Stanek Rea
*Acting Director of the United States Patent and Trademark Office*